United States Patent [19]

Maeda

[11] Patent Number: 5,612,937
[45] Date of Patent: Mar. 18, 1997

[54] OPTICAL PICKUP APPARATUS HAVING A BISECTED OPTICAL RECEIVING ELEMENT FOR TRACKING CONTROL

[75] Inventor: Takanori Maeda, Tsurugashima, Japan

[73] Assignee: Pioneer Electronic Corporation, Tokyo, Japan

[21] Appl. No.: 489,440

[22] Filed: Jun. 12, 1995

[30] Foreign Application Priority Data

Jun. 13, 1994 [JP] Japan .................................. 6-130597

[51] Int. Cl.$^6$ .................................................. G11B 7/095
[52] U.S. Cl. ............................................. 369/44.42; 369/58
[58] Field of Search ............................. 369/44.23, 44.25, 369/44.32, 44.37, 44.41, 44.42, 54, 58, 111, 112, 120, 121

[56] References Cited

U.S. PATENT DOCUMENTS

| | | | |
|---|---|---|---|
| 4,283,777 | 8/1981 | Curry et al. | 369/44.37 X |
| 4,695,992 | 9/1987 | Aio | 369/44.42 X |
| 4,783,589 | 11/1988 | Ando | 369/44.42 X |
| 5,155,718 | 10/1992 | Hashimoto et al. | 369/44.42 X |
| 5,329,508 | 7/1994 | Matsueda | 369/44.42 X |

*Primary Examiner*—W. R. Young
*Attorney, Agent, or Firm*—Sughrue, Mion, Zinn, Macpeak & Seas

[57] ABSTRACT

An optical pickup apparatus including: an irradiation optical system for irradiating a light beam to at least one track of a recording medium carrying a recorded signal to be read, an image formation device for preforming an image formation of a real image for the recorded signal or track of the recording medium to make an image surface by using a reflected light from an irradiated portion of the light beam, and a photodetector for detecting the reflected light and having an optical receiving element disposed on the image surface. The optical receiving element has at least one first optical receiving element for tracking control which is bisected in a track image direction formed on the image surface such that the first optical receiving element has a width in a perpendicular direction to the track direction smaller than a distance represented by twice a track pitch in a track image formed on the first optical receiving element less a width of the track image. The optical receiving element further includes at least one second optical receiving element of signal-reading disposed adjacent to the first optical receiving element in the track image direction. The optical pickup apparatus is thus capable of stably reading a recorded signal from the optical disk and of stably performing a tracking operation by its simple construction.

12 Claims, 14 Drawing Sheets

FIG.13
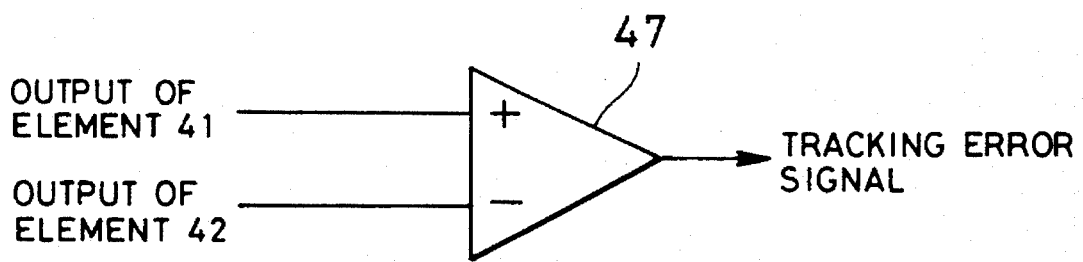
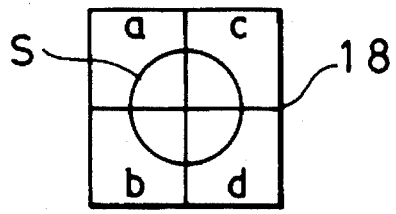
FIG.14A
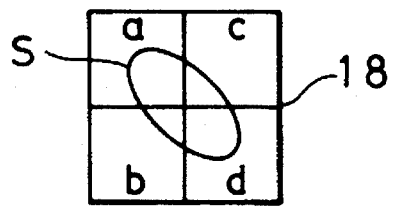
FIG.14B
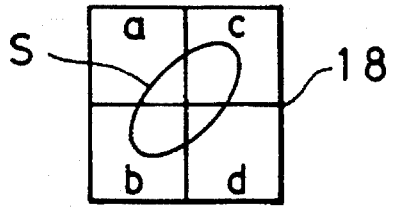
FIG.14C

OPTICAL PICKUP APPARATUS HAVING A BISECTED OPTICAL RECEIVING ELEMENT FOR TRACKING CONTROL

BACKGROUND OF THE INVENTION

1. Field of the Invention

The present invention relates to an optical pickup apparatus for reading a recorded signal from a track of a recording medium.

2. Description of the Related Art

In recent years, it have been planed in the HDTV (high definition television) art to digitalize a HDTV signal and record and reproduce it in an optical disk. The processing of the HDTV signal requires a very high transfer rate e.g., 50 Mbps (bps: bit per second), more than 40 times that of an optical compact disk (1.2 Mbps) as it is used.

In a conventional recording and reproducing method for an optical disk, information is recorded on a track spiralling from its inner to outer of the optical disk by using a single recording light beam and then, in case of reproducing it, the recorded information signal is read by using a single reading light beam. There is generally used a three-light-beam method for properly tracing the track by the reading light beam in which two satellite light beams are utilized for the tracking control.

FIG. 1 shows an arrangement of light spots formed by three light beams on the optical disk in the three-light-beam method in which recorded signals (pits) PT are read out of a central track 15 between the adjacent tracks 14, 16 formed on the optical disk. The pits are represented by crosshatching. A light beam is divided into three beams by a diffraction grating (not shown) and the three beams form the three light spots 11–13 on the optical disk. The light spot 11 is shifted and placed at an inner side by a ¼ track pitch with respect to the track 15 in the optical disk (it is adjacent to the track 14), and the light spot 12 is in the center of the track 15 and the light spot 13 is shifted and placed at an outer side by a ¼ track pitch with respect to the track 15 in the optical disk (it is adjacent to the track 1).

FIG. 2 shows diffraction patterns formed on a photodetector D by the reflected lights from light spots shown in FIG. 1. Namely, the reflected light from a track or pit within the light spot 11 of the optical disk forms a circular pattern 11a on an optical receiving element 17 of the photodetector D. The reflected light from a track or pit within the light spot 12 of the optical disk forms a circular pattern 12a on a quadrisected optical receiving element 18 of the photodetector D. The reflected light from a track or pit within the light spot 13 of the optical disk forms a circular pattern 13a on an optical receiving element 19 of the photodetector D. Since a cylindrical lens 8 is used in a detecting optic system as shown in FIG. 3, a photodetector D including the optical receiving elements 17–19 is disposed at a non-image formation position IV shifted from an image formation position IP of the pit of the optical disk 34 caused by an objective lens 33. Therefore, the circular diffraction patterns formed on the optical receiving elements 17–19 of the photodetector are larger than sizes of pit images on the image formation position IV obtained by a product both of the pit diameter and the transverse magnification of the objective lens, respectively. Furthermore, the optical receiving elements 17–19 of the photodetector a photodetector have a large area in such a manner that each element receives the moving circular light spot caused by the driven objective lens in the pickup apparatus.

A difference signal between the outputs obtained from the optical receiving element 17,19 of the photodetector becomes zero when the light spot 12 is on the center of the track 15. On the other hand, the difference signals during the shifted light spot positions of inner and outer sides of the track 15 become large with an inverse polarity respectively. It is therefore possible to control such that the position of light spot 12 is always on the center of the track 15 by driving the objective lens in the basis of the difference signal. The recorded signal is probably read on the basis of output signals supplied from an optical receiving element 18 of the photodetector receiving the reflected light from the light spot 12. In this way, a three-light-beam method utilizes only one of three light beams for reproducing the recorded signal information.

The three-light-beam method of tracking control is intended to keep the light spot at the center of the track in optical disk in such a manner that the circular diffraction pattern on the optical receiving element of the photodetector is moved by the objective lens. It is necessary to enlarge the area of the optical receiving element of the photodetector in order that the diffraction pattern moves out of the optical receiving element of the photodetector in the tracking control.

There is also known the push-pull method as a conventional tracking control method other than the three-light-beam method. In the push-pull method, a photodetector having a bisected optical receiving element is used. As shown in FIG. 4, the photodetector having bisected optical receiving elements 65, 66 is disposed at a non-image formation position IV shifted from an image formation position IP of the pit of the optical disk 34 caused by an objective lens 33. As shown in FIG. 5, when a light spot 13 is formed at a center of the track 15 on an optical disk, as shown in FIG. 6 the bisected optical receiving element 65, 66 receives a diffraction pattern 67 with an intensity distribution (hatching) caused by the zeroth and first order diffraction lights reflected from the pit within the light spot 13. The optical receiving elements 65, 66 have an area larger than the size of light spot 67 of the zeroth order diffraction light spot. The light spot position on the optical disk is controlled in such a manner that difference between the outputs supplied from the optical receiving elements 65, 66 is kept constant and at the same time the recorded signal in the optical disk is read on the basis of the diffraction patter. The push-pull method of tracking control method utilizes only one light beam for reading the recorded signal form the optical disk.

In order to raise the transfer rat in such methods above for reading the recorded signal by using a single light beam, it is necessary to speed up the rotation of the optical disk or make a high density of the recorded signals higher. However, there are problems in the speed up of the disk and the high density thereof. This is because the rotation speed of the optical disk is limited at about five times as it is, since it is difficult to control precisely the objective lens of the pickup device in response to the focus error signal caused by an eccentricity, warp and so on of the optical disk. Furthermore, the density of the recorded signals is limited at twice as it is even when a light beam with a short wavelength e.g., a blue light is used for recording the information signals. Even if both the speed up of the disk's rotation and the high recording density thereof are preformed, the limit of transfer rate is about ten times as it is at most.

On the other hand, there is a method for reproducing information from an optical disk by using three light beams for the HDTV which is presented in the general meeting 1993(20-1) of the Television Society. This method improves the transfer rate by means of the irradiations of three light beams to three adjacent tracks are preformed at the same time to read collectively the recorded signals in the three track. The optical receiving elements of the photodetector are disposed at the non-image formation position for the optical disk in the reading optics, in which the diameter of each light spot on the optical disk is converged to the limit of the diffraction and then, the recorded information included in the reflected light is read as one channel signal. It is necessary for the reading light beam to properly tracing the track in this method. Therefore, the three-light-beam method of tracking control as shown in FIG. 7 is utilized in this method.

As shown FIG. 7 of the method for reproducing information from an optical disk by using three light beams for the HDTV, light spots 21–23 are formed on the optical disk. The light spot 21 is shifted and placed at an outer side of the track 24 in the optical disk, and the light spot 22 is in the center of the track 25, and the light spot 23 is shifted and placed at an inner side of the track 26 in the optical disk.

FIG. 8 shows diffraction patterns formed on a photodetector D by the reflected lights from light spots shown in FIG. 7. Namely, the reflected light from a track or pit within the light spot 21 of the optical disk forms a circular pattern 21a on an optical receiving element 27 of the photodetector D. The reflected light from a track or pit within the light spot 22 of the optical disk forms a circular pattern 22a on a quadrisected optical receiving element 28 of the photodetector D. The reflected light from a track or pit within the light spot 23 of the optical disk forms a circular pattern 23a on an optical receiving element 19 of the photodetector D.

This method utilizes the photodetector similarly to the above three-light-beam method of tracking control method, in which the intensity difference between the reflected light spots 21a, 23a caused by the light spots 21, 23 are used for controlling the position of light spots. In this case, since the recorded signals of the track 24, 26 are read from the positions of reflected light spots 21a, 23a through the optical receiving element 27, 29, the transfer rate is improved.

However, the number of light spots have to be increased in order to improve the transfer rate in the particular method for reproducing information from an optical disk by using three light beams for the HDTV. As a result, it is a drawback to complicate the construction of the optical pickup apparatus using such a three-light-beam method.

SUMMARY OF THE INVENTION

Thus, the present invention has been made to solve such a problem in view of the forgoing status. An object of the invention is to provide an optical pickup apparatus capable of stably reading a recorded signal from an optical disk and of stably performing a tracking operation by means of an optical receiving element disposed on an image surface formed in a photodetection optic system for detecting the reflected light from the disk.

An optical pickup apparatus according to the invention for reading a recorded signal from a track of a recording medium comprises:

an irradiation optical system for irradiating a light beam to at least one track of a recording medium carrying a recorded signal to be read;

an image formation means for preforming an image formation of a real image for said recorded signal or track of said recording medium to make an image surface by using a reflected light from an irradiated portion of said light beam;

a photodetection means for detecting the reflected light and having an optical receiving element disposed on said image surface; and said optical receiving element having, at least one first optical receiving element of tracking control bisected in a track direction of a track image formed on said image surface, wherein said first optical receiving element has a width in a perpendicular direction to the track direction smaller than a distance resulted from that twice of a track pitch in a track image formed on said first optical receiving element is subtracted by a width of said track image, and at least one second optical receiving element of signal-reading disposed adjacent to said first optical receiving element in the track direction of the track image.

In the optical pickup apparatus of the invention, a photodetector separately has optical receiving elements for a tracking control and a signal-reading respectively which are disposed on an image surface corresponding to a surface of a recording medium carrying pits as recorded signals. The optical receiving element for the tracking control is bisected in the track direction of the image of the recording medium surface and, its width in a perpendicular direction to the track direction d is satisfied the following non-equation:

$$d < 2 \times \alpha \times p - \alpha \times s$$

wherein $\alpha$ denotes the transverse magnification of the image formation optic system, and p denotes a track pitch of a track image of the recording medium, and s denotes a width of a track or pit image.

The above and other objects, features and advantages of the present invention will become more apparent from the following description when taken in conjunction with the accompanying drawings in which a preferred embodiment of the invention is shown by way of illustrative example.

BRIEF DESCRIPTION OF THE DRAWINGS

FIG. 13 is a schematic circuit diagram of a circuit for generating a tracking error signal used in the optical pickup apparatus according to the present invention;

FIGS. 14 A, 14 B and 14 C are partially enlarged plan views each showing a quadrisected photodetector having four optical receiving elements used in the optical pickup apparatus according to the present invention which illustrating changes of light spots formed thereon;

DETAILED DESCRIPTION OF THE PREFERRED EMBODIMENTS

The preferred embodiments according to the present invention will be described in detail with reference to the accompanying drawings.

Figure 1:
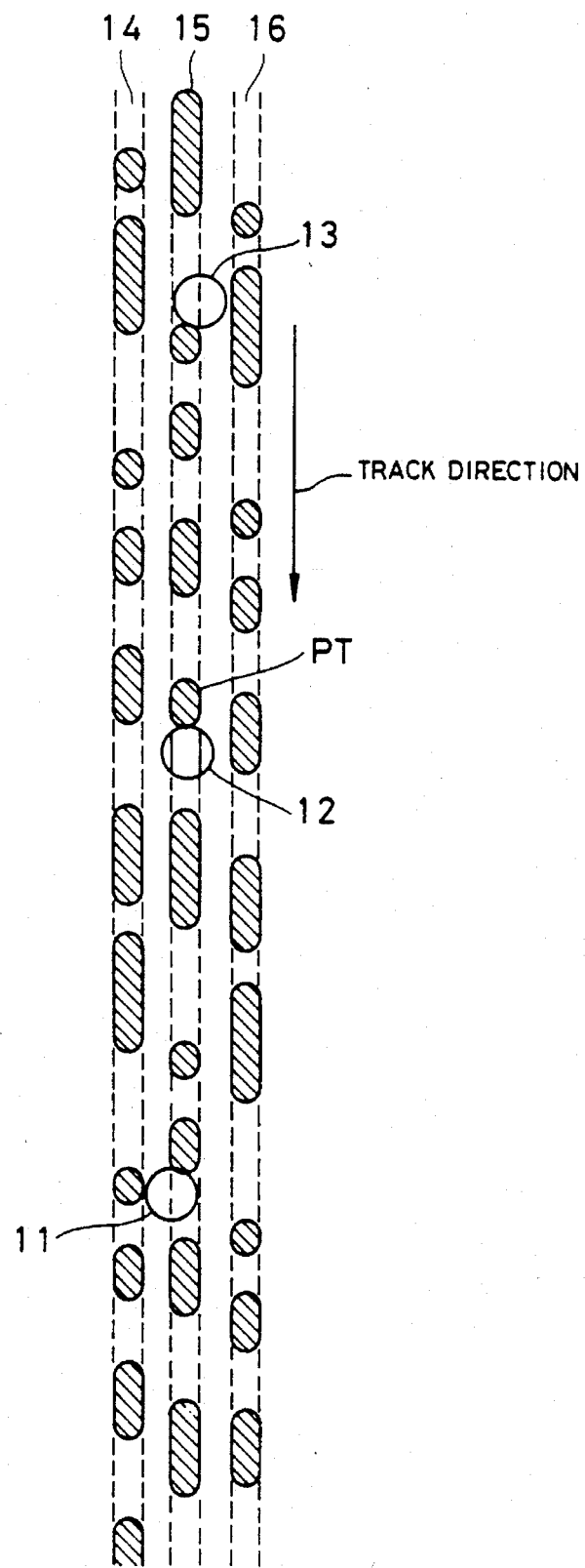
FIG. 1 is a partially enlarged plan view of an optical disk showing irradiated light spots formed thereon by mean of the three-light-beam tracking control method.
Figure 2:
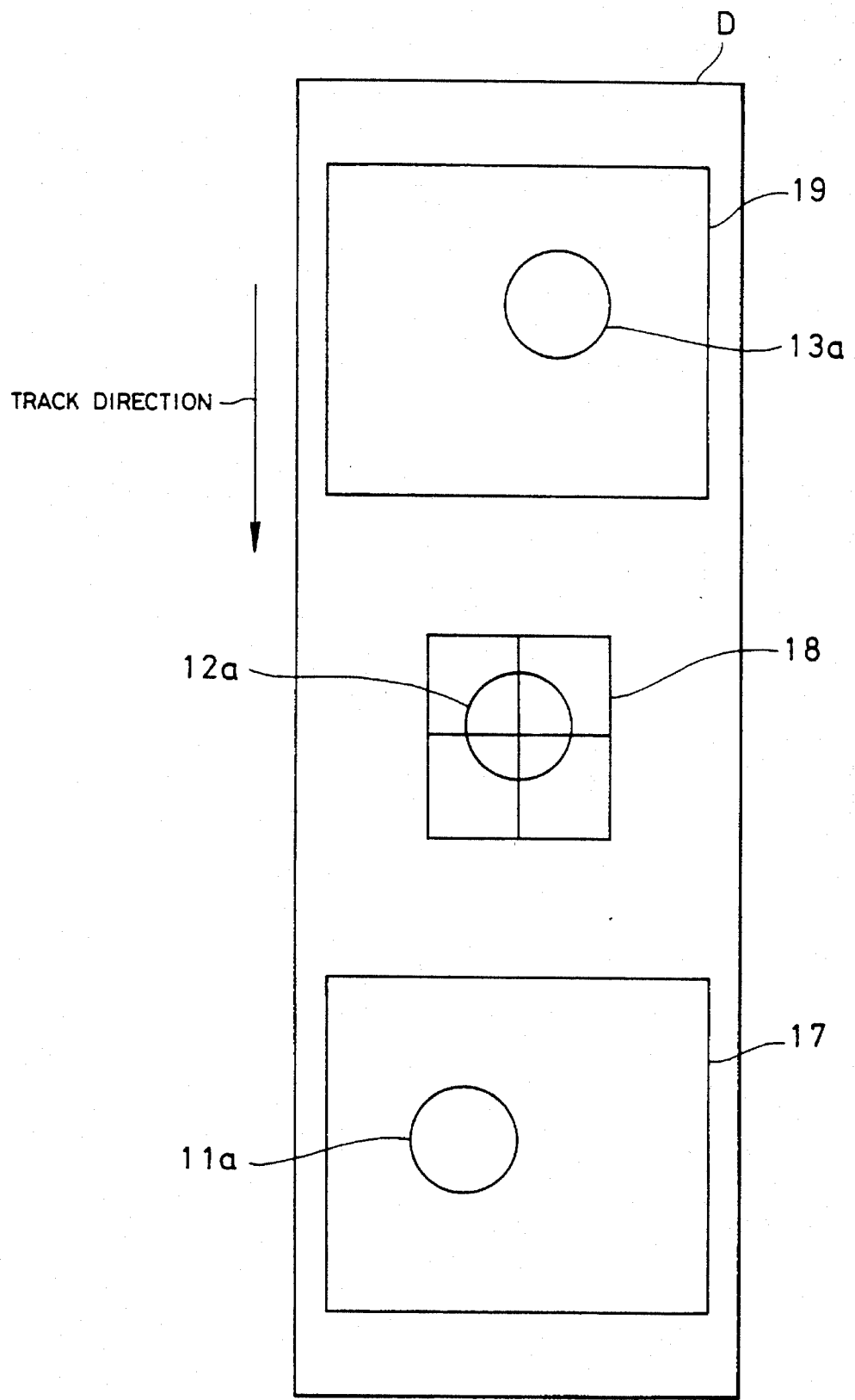
FIG. 2 is a partially enlarged plan view of a photodetector showing its optical receiving elements for receiving reflected lights used in the three-light-beam tracking control method of FIG. 1.
Figure 3:
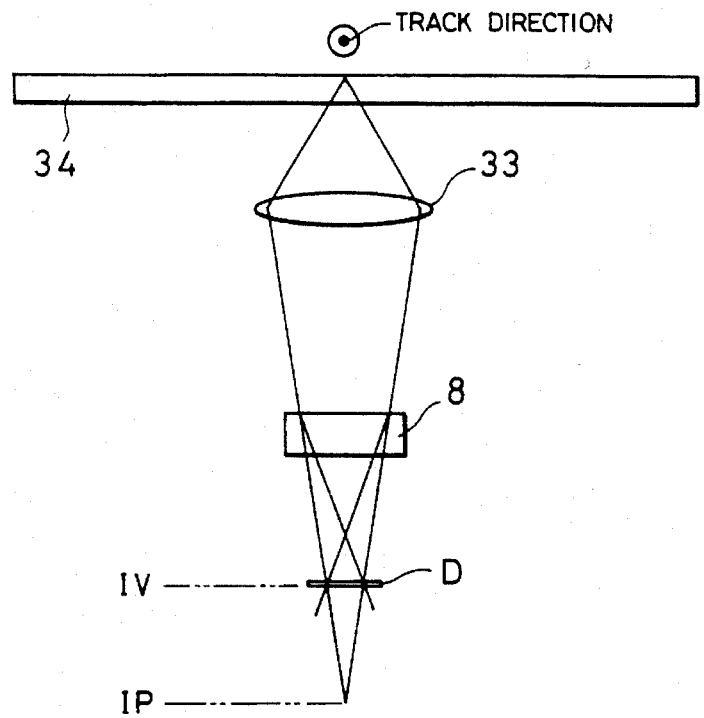
FIG. 3 is a schematic diagram of a photodetection optic system showing a position of the photodetector including optical receiving elements used in the three-light-beam tracking control method of FIG. 2.
Figure 4:
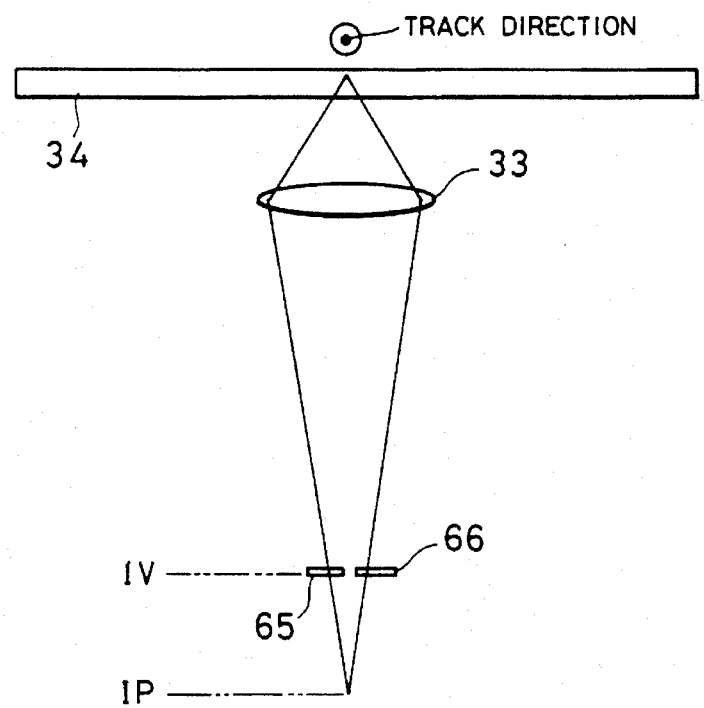
FIG. 4 is a schematic diagram of a photodetection optic system showing a position of the photodetector including optical receiving elements used in the push-pull method.
Figure 5:
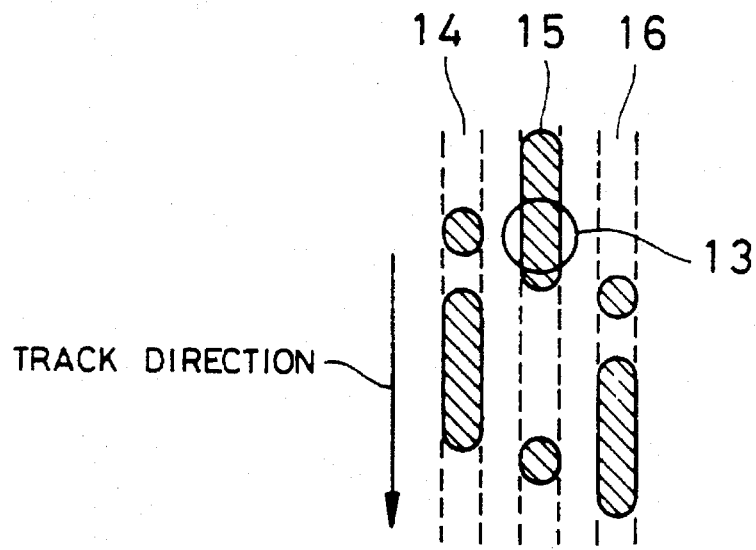
FIG. 5 is a partially enlarged plan view of an optical disk showing an irradiated light spot formed thereon by mean of the push-pull method of FIG. 4.
Figure 6:
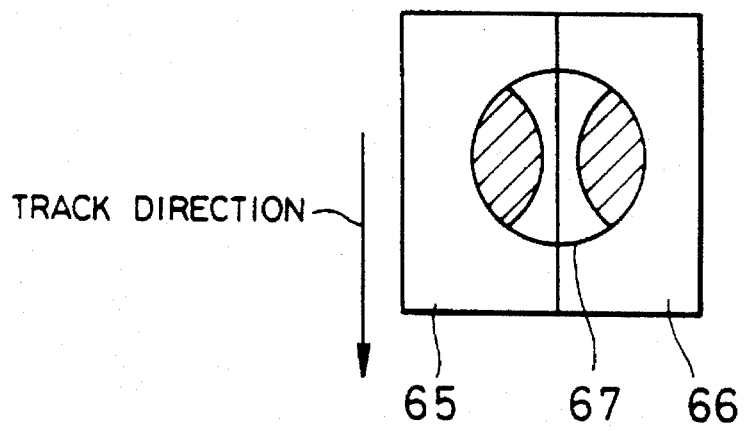
FIG. 6 is a partially enlarged plan view of a photodetector showing its optical receiving elements for receiving a diffraction pattern formed thereon by mean of the push-pull method of FIG. 4.
Figure 7:
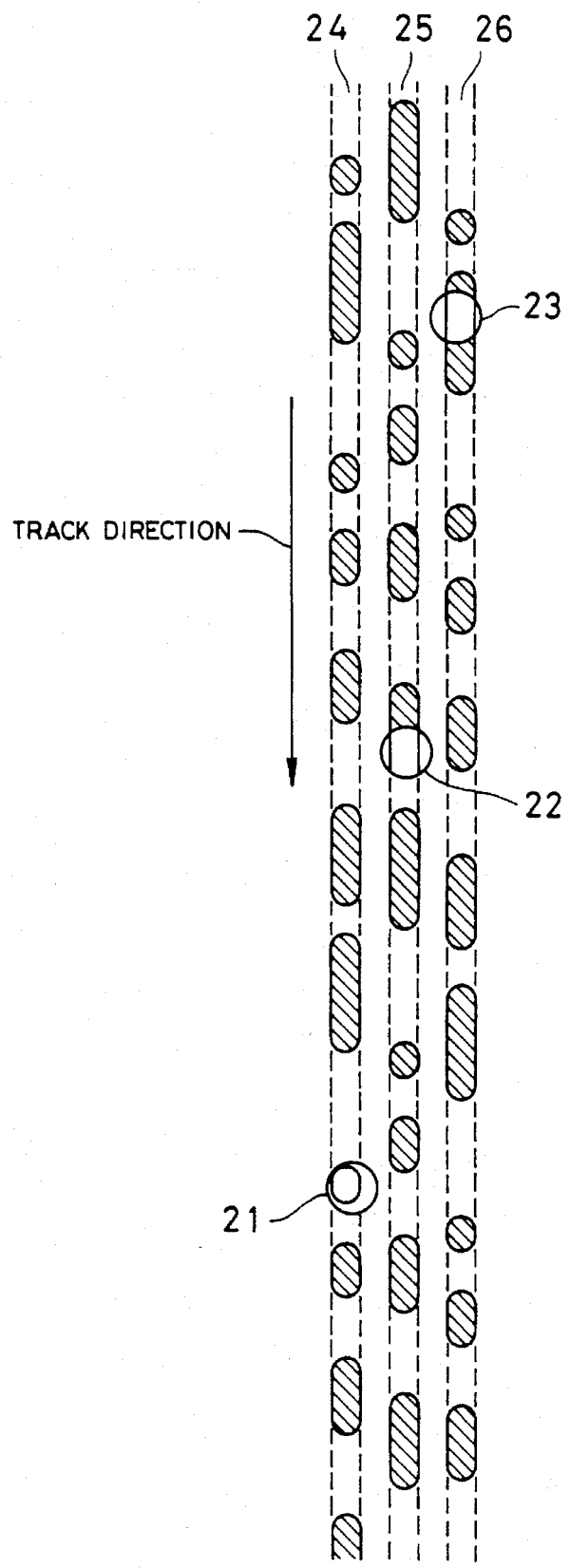
FIG. 7 is a partially enlarged plan view of an optical disk showing irradiated light spots formed thereon by mean of the method for reproducing information from an optical disk by using three light beams for the HDTV.
Figure 8:
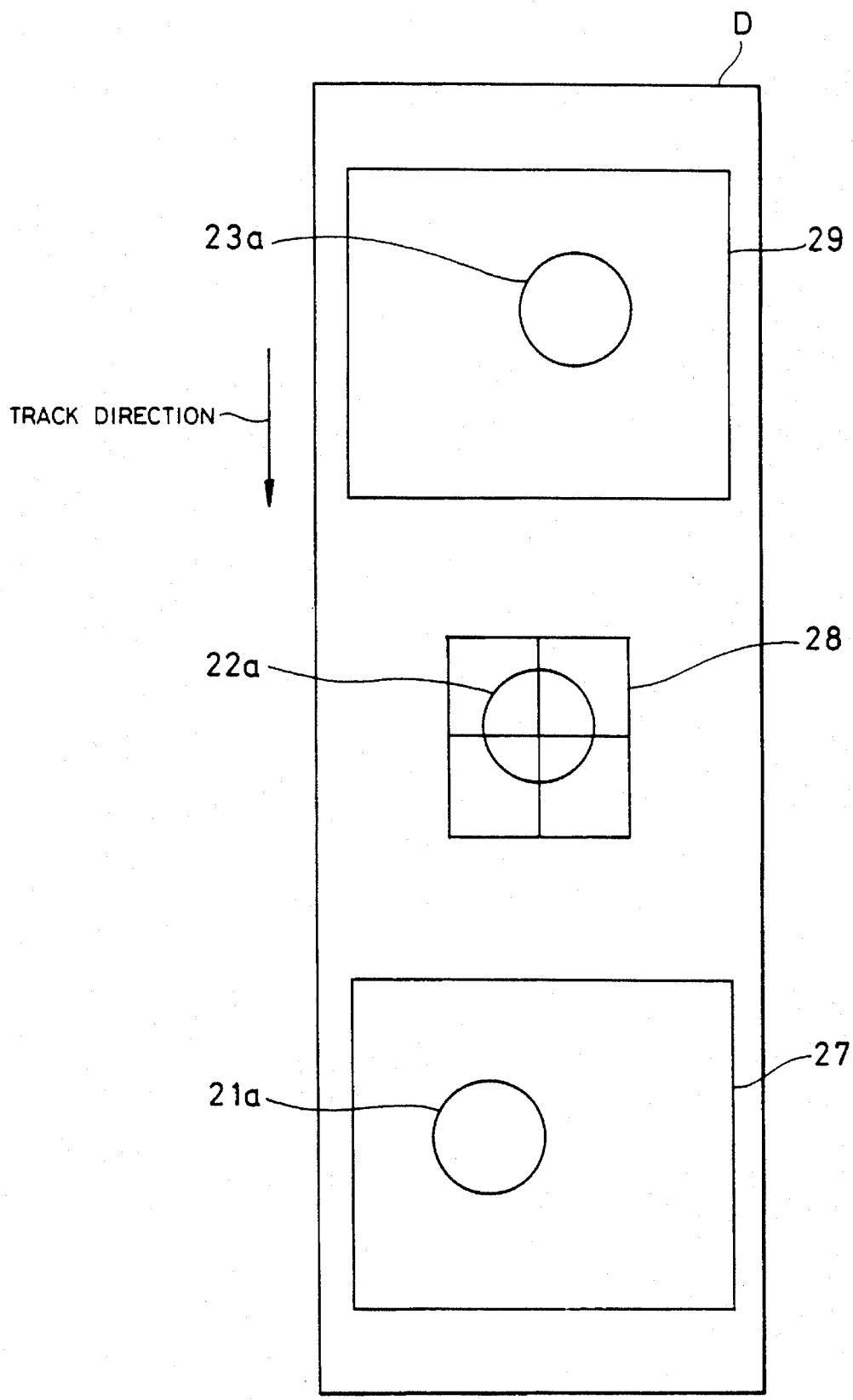
FIG. 8 is a partially enlarged plan view of a photodetector showing its optical receiving elements for receiving reflected lights used in the method for reproducing information from an optical disk by using three light beams for the HDTV of FIG. 7.
Figure 9:
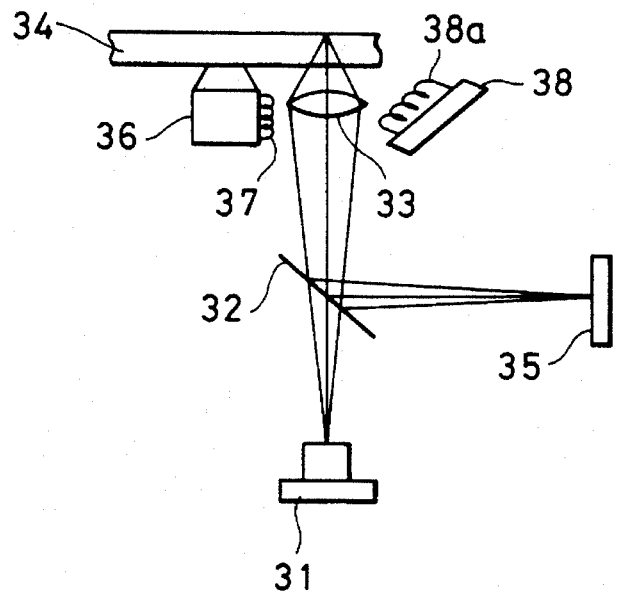
FIG. 9 is a schematic diagram of an optical pickup apparatus according to the present invention.

FIG. 9 shows a reading device including an optical system for reading a recorded signal from an optical disk according to the invention a recorded signal. In this optical system, a light beam emitted from a light source 31 such as a semiconductor laser is irradiated through a light beam splitter 32 and an objective lens 33 onto an optical disk 34. The irradiation of light is performed over at least one track or more carrying a recorded signal to be read in the optical disk 34. The optical disk 34 reflects the light beam through the objective lens 33 to the light beam splitter 32 in which the reflected light is deflected to a photodetector 35. The photodetector 35 detects the recorded signal. A focus-position-detection means 36 included in the apparatus detects a focus position on the optical disk 34 to generate a focus error signal. A focus-control driving mechanism 37 included in the apparatus is driven in response to a detected output of the photodetector. The pickup apparatus is provided with a tracking control driving mechanism 38 which is driven in response to a tracking error signal described later.

Figure 10:
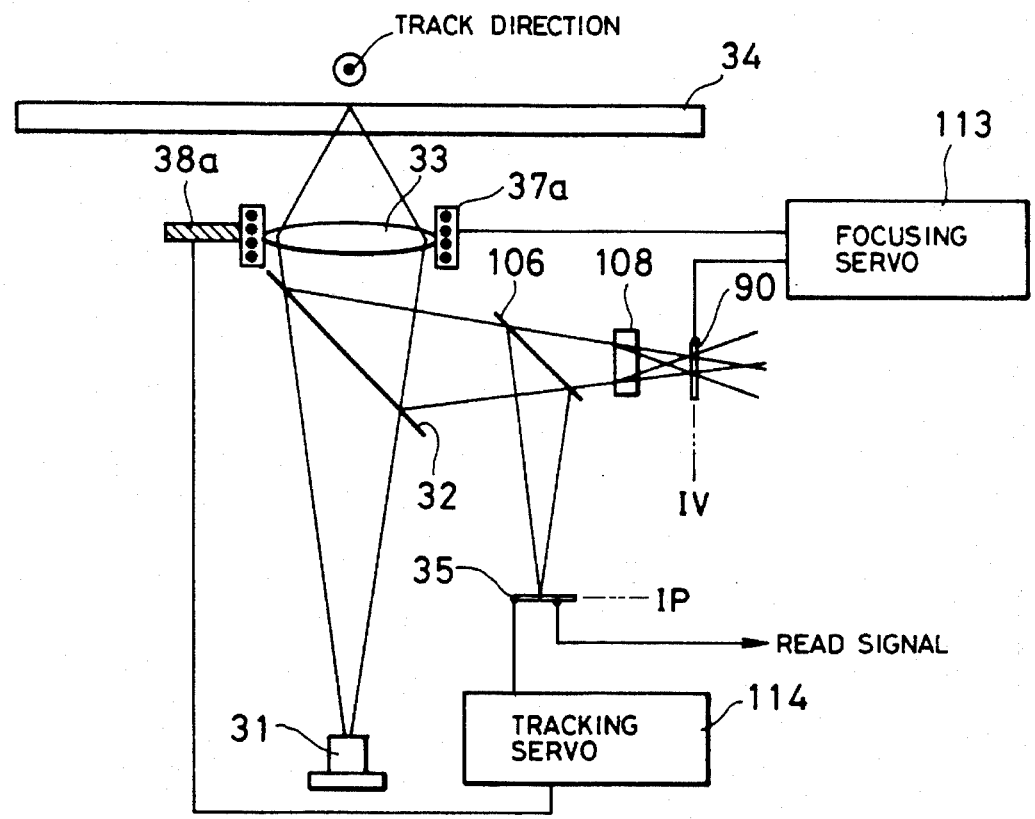
FIG. 10 is a schematic diagram of another embodiment of an optical pickup apparatus according to the present invention.

FIG. 10 shows another optical pickup apparatus according to the invention. This optical pickup apparatus comprises an irradiation optical system including a light source 31 and an objective lens 33 to irradiate a light beam to the surface of an optical disk 34; a detecting optic system including the objective lens 33, light beam splitters 32, 106 and a bisected photodetector 35 to detect a reflected light to generate a tracking error signal and a recorded signal; a focus-error-signal-detecting optical system including the objective lens 33, the light beam splitter 32, a cylindrical lens 108 and a quadrisected photodetector 90 to detect a reflected light to generate a focus error signal; a focus control driving mechanism including a focusing servo circuit 113 and a coil 37a for driving the objective lens 33 in the axis direction of the irradiated light beam 33 in response to the focus error signal; and a tracking control driving mechanism including a tracking servo circuit 114 and a coil 38a for driving the objective lens 33 in the radial direction of the optical disk in response to the tracking error signal. The one optical receiving element or more for generating the recorded signal in the photodetector is disposed at an image formation position IP conjugate to a pit on the optical disk 34 with respect to the objective lens 33. The bisected photodetector 35 is also disposed at the image formation position IP. On the other hand, a quadrisected photodetector 90 is disposed at a non-image formation position IV shifted from the image formation position IP conjugate to a pit on the optical disk 34 with respect to the objective lens 33.

The inventor suggests in order to improve the transfer rate that the position of the optical receiving element of the photodetector is set on the image formation position IP conjugate to a pit on the optical disk 34 with respect to the objective lens 33 but not the non-image formation position. In this construction, it is not necessary to irradiate a plurality of light spots onto the optical disk. When only one light spot is irradiated over a plurality of adjacent tracks on the optical disk, the real images of a plurality of tracks or pits on the optical disk image are formed by the objective lens 33 on the image plane i.e., the optical receiving element of the photodetector. As a result, recorded signals are detected from a plurality of the pits or tracks of the optical disk at the same time without increase of the number of light spot.

In case that the pickup apparatus reads the recorded signal from an optical disk comprising a recording layer made of a dye or a phase-change material in which the signal is recorded as a change of reflectance between a light absorbing region and a light reflecting region of the recording layer, the object of distribution pattern of reflectance on the optical disk is projected as a real image on the optical receiving element of the photodetector. Alternatively, in case that the pickup apparatus reads the recorded signal from an optical disk comprising a recording layer carrying the so-called pits i.e., minute recesses or protrusions in which the signal is recorded correspondingly to the pits, the pits on the optical disk may be projected as a black spot images respectively on the optical receiving element of the photodetector because the numerical aperture is restricted in the detection optical system. If the numerical aperture is not restricted and have a sufficient large value thereof, each spot image is formed with a black edge. Furthermore, in case that the pickup apparatus reads the recorded signal from a magneto-optical disk comprising a recording layer made of a ferromagnetic material in which the signal is recorded as a change of polarization of the recording layer, the changed polarization pattern on the optical disk is projected as a black spot image on the optical receiving element of the photodetector by using a polarizing microscope system in the pickup apparatus. In these case, the conjugate image corresponding to the recorded signal on the optical disk is formed on the image formation position IP at which the photodetector is disposed in the pickup apparatus.

Figure 11:
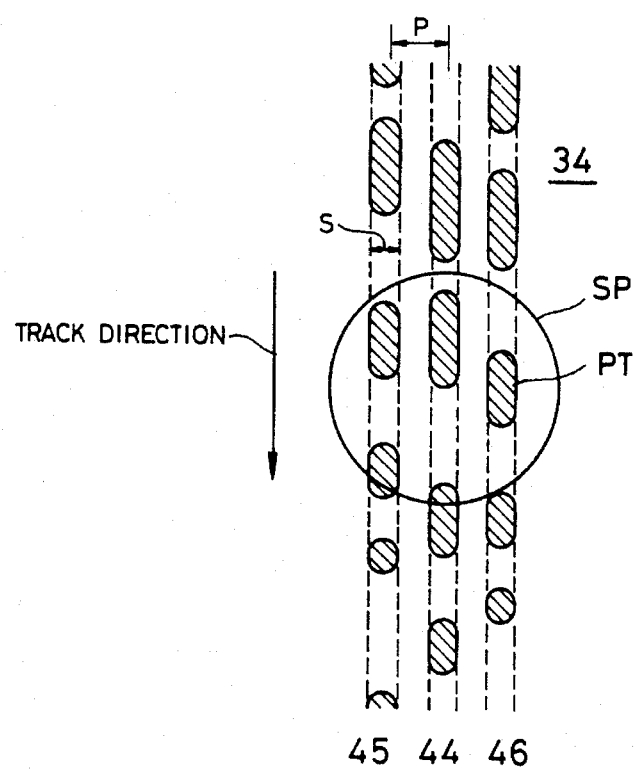
FIG. 11 is a partially enlarged plan view of an optical disk showing irradiated light spots formed thereon by an optical pickup apparatus according to the present invention.
Figure 12:
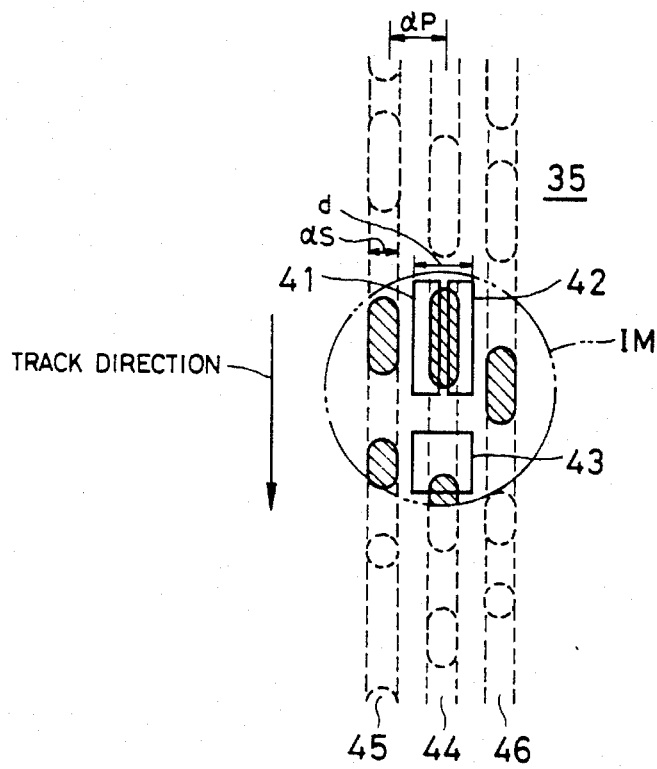
FIG. 12 is a partially enlarged plan view of a photodetector showing a real image of tracks and pits formed thereon and its optical receiving elements for detecting the images used in the optical pickup apparatus according to the present invention.

FIG. 11 shows a light spot SP of the converged light beam irradiated over three tracks 44–46 with pits PT on the optical disk 34 in which the track is spirally or concentrically formed with a track width or pit width s and a track pitch p. The track 44 is a track image to be read at this stage. The track images 45, 46 are adjacent to the track image 44 at both sides. FIG. 12 shows three optical receiving elements of the photodetector 35 and the images corresponding to the tracks 44–46 and pits PT formed by the reflected light from the light spot SP of the optical disk 34. The photodetector 35 comprises a first optical receiving element having two half elements 41, 42 used for the tracking control and a second optical receiving element 43 used for the signal-reading. The first optical receiving element is equally bisected into the elements 41, 42 at a boundary along the track direction of the image. The second optical receiving element 43 is disposed adjacent to the first optical receiving element 41, 42 on the boundary along the track direction of the image. The light spot SP on the optical disk 34 shown in FIG. 11 is irradiated in such a manner that an image surface region IM shown in FIG. 12 in which the real image of the tracks 44–46 and pits PT are formed by the reflected light on the first optical receiving element 41, 42 and the second optical receiving element 43.

The bisected optical receiving element 41, 42 of the photodetector 35 has a width in a perpendicular direction to the track direction smaller than a distance resulted from that twice of a track pitch in a track image formed on said first optical receiving element is subtracted by a width of the track image. In other words, assume that the transverse magnification of the image formation optical system is represented by $\alpha$, and the track pitch on the optical disk is represented by p, then a pitch of track images 44, 45, 46 on the image surface i.e., the optical receiving element of the photodetector 35 appears as $$\alpha \times p \quad (1)$$

Therefore, the width d of the bisected optical receiving element including a gap between its bisected elements 41, 42 can be established the following non-equation, $$d < 2 \times \alpha \times p - \alpha \times s \quad (2)$$

where s denotes a track width or pit width on the optical disk. In this way, when the non-equation condition (2) is satisfied, each bisected optical receiving element is not influenced by the adjacent track images 45, 46 or pit image so that only the track image 44 to be read is detected surely.

On the other hand, if the condition of the width of the bisected optical receiving element is set as follows:

$$d \geq 2 \times \alpha \times p - \alpha \times s \quad (3)$$

then, it is impossible to read only the track image 44 to be read to detect hardly a tracking error signal.

When the width d of the bisected optical receiving element is satisfied by the non-equation condition (2), the proper tracking position detection is performed. The width d of the condition (2) is easily selected properly in accordance with the wavelength of light to be used, the pit width or track pitch of the optical disk.

In addition, the controlling of the objective lens of the focus position is preformed as follows: In case of the system of FIG. 9, the focus position detection means 36 measures the focus position to control the focus control driving mechanism 37 in such a manner that the position of the optical receiving elements 41–43 in the photodetector 35 coincides with the image surface formed by the objective lens in conjugate with the surface of the optical disk. As a result, the pit image corresponding to the pits of the optical disk is always formed on the optical receiving element 41–43 of the photodetector 35. In the case of the pickup apparatus shown in FIG. 10, and particularly, in a focus error detection circuit 113, the photoelectric conversion outputs of every diagonally adjoining two of four elements a, b, c, d of the quadrisected photodetector 90 are added by the adders respectively, and then the difference signal between the results of those two additions is acquired by the differential amplifier, thus generating a focus error signal. When the focused laser beam is focus, the spot light S of a true circle as shown in FIG. 14A is formed on the quadrisected photodetector 90. Therefore, the result of the addition of one diagonal pair of elements among the four elements equals to the result of the addition of the photoelectric conversion outputs of the other diagonal pair of elements, and the focus error signal component becomes "0". In contrast, when the focused laser beam is out of focus, the ellipsoidal spot light S as shown in FIG. 14B or 14C is formed on the quadrisected photodetector 90. Therefore, the result of the addition of the photoelectric conversion outputs of one diagonal pair of four elements differs from the result of the addition of the photoelectric conversion outputs of the other diagonal pair of elements. Thus, the focus error signal output from the differential amplifier has a value corresponding to the focus deviation. The coil 37a shown in FIG. 10 is driven in the axial direction of the irradiated laser beam in response to the focus error signal, and thus the pit image corresponding to the pits of the optical disk is always formed on the optical receiving elements 41–43 of the photodetector 35.

When the pit image corresponding to the pits of the optical disk is formed on the optical receiving elements 41–43 of the photodetector 35 during the focus position of the converged laser beam, the extending line of the dividing line of the bisected optical receiving elements 41, 42 bisects the optical receiving element 43 in the track direction of the image. Namely, the optical receiving element 43 receives the center of the track image while the dividing line of the bisected optical receiving element 41, 42 coincides with the center of the track image. The photoelectric conversion outputs of the bisected optical receiving elements are supplied to a differential amplifier 47 in the tracking servo circuit 114. The differential amplifier 47 produces a difference between the photoelectric conversion outputs from the bisected optical receiving elements as a tracking error signal. Since the bisecting line of the two elements of the bisected optical receiving elements optically matches with the track direction in the disk, the amounts of light at the two element are equal to each other when the light spot is on the track of the disk. When the light spot is out of the track, there is a difference between those light amounts at the two elements. Therefore, the differential amplifier 47 as shown in FIG. 13 computes a difference signal on the basis of the outputs from the bisected optical receiving element 41, 42 to generate the tracking error signal. The tracking control driving mechanism 38 is driven in response to the tracking error signal from the differential amplifier 47, so that the optical receiving element 43 is able to read a recorded signal from the track image 44.

Figure 15:
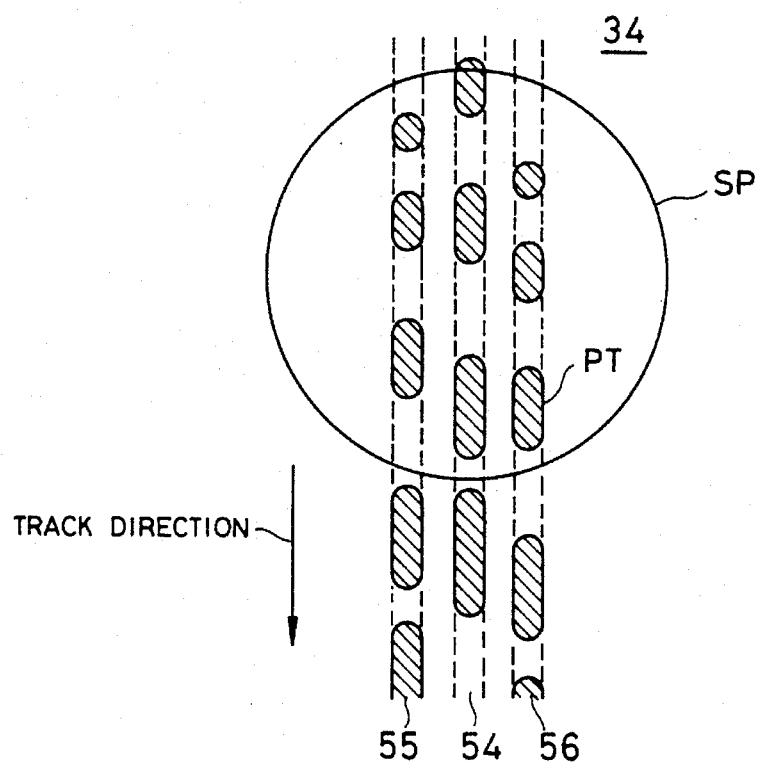
FIG. 15 is a partially enlarged plan view of an optical disk showing irradiated light spots formed thereon by another optical pickup apparatus according to the present invention.
Figure 16:
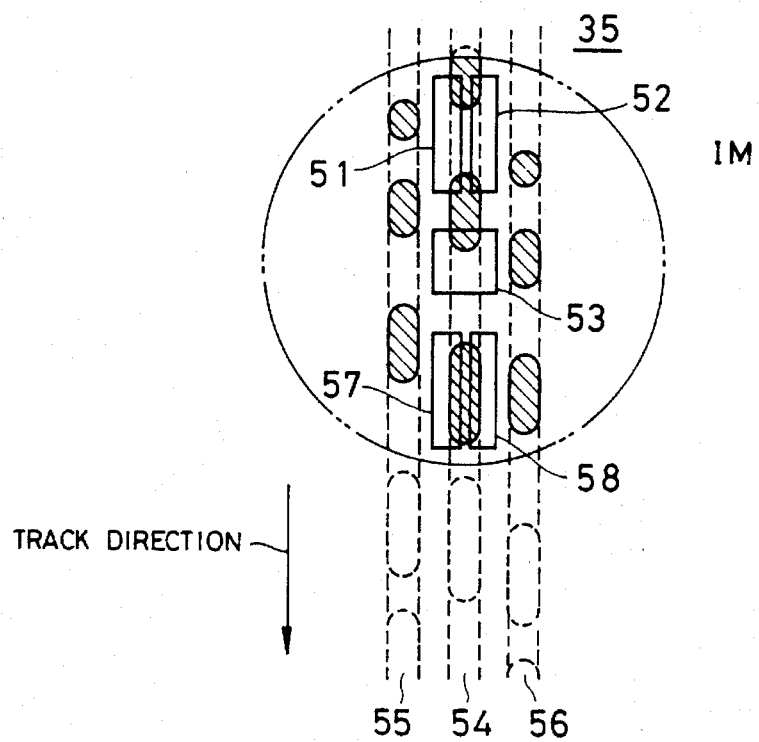
FIG. 16 is a partially enlarged plan view of a photodetector showing a real image of tracks and pits formed thereon and its optical receiving elements for detecting the images used in the optical pickup apparatus according to the present invention of FIG. 15.

FIG. 15 shows a light spot SP of the converged light beam irradiated over three tracks 55–56 with pits PT on the optical disk 34 in which the track is spirally or concentrically formed with a track width or pit width s and a track pitch p. FIG. 16 shows optical receiving elements of the photodetector 35 and the images corresponding to the tracks 55–56 and pits PT formed by the reflected light from the light spot SP of the optical disk 34. The photodetector 35 has five optical receiving elements 51, 52, 53, 57 and 58. The bisected optical receiving elements 51, 52 are used for the tracking control as a first optical receiving element which is equally bisected at a boundary along the track direction of the image. The bisected optical receiving element 57, 58 are also an optical receiving element which is equally bisected at the same boundary along the track direction of the image. The second optical receiving element 53 is disposed adjacent to and between a pair of the first optical receiving elements 51, 52 and 57, 58 on the boundary along the track direction of the image. The track 54 is a track image to be read at this stage. The track images 55, 56 are adjacent to the track image 44 at both sides. The light spot SP on the optical disk 34 shown in FIG. 15 is irradiated in such a manner that an image surface region IM shown in FIG. 16 in which the real image of the tracks 55–56 and pits PT are formed by the reflected light on the five optical receiving elements 51, 52, 53, 57 and 58.

Assume that the transverse magnification of the image formation optical system is represented by $\alpha$ and the track pitch on the optical disk is represented by p in a similar manner of the embodiment shown in FIG. 12, then a pitch of track images 55–56 on the image surface of the optical receiving elements of the photodetector 35 appears as the same as the condition (1) above mentioned. In addition, the width d between the bisected elements 51, 52 including a gap therebetween is established by the condition (2) above mentioned as well as the width d between the bisected elements 57, 58 is respectively. Therefore, each bisected optical receiving element is not influenced by the adjacent track images 55, 56 or pit images so that the optical receiving element 53 surely detects only the track image 54 to be read.

In addition, the controlling of the objective lens of the focus position is preformed by a similar manner of the embodiment shown in FIGS. 9 and 10. For example, the focus position detection means 36 measures the focus position to control the focus control driving mechanism 37 in such a manner that the position of the photodetector 35 coincides with the image surface formed by the objective lens 33 in conjugate with the surface of the optical disk. As a result, the pit image corresponding to the pits of the optical disk is always formed on the photodetector 35.

In this time, the pit image of the track 54 is formed on the optical receiving element of the photodetector 35. The common bisected line of the optical receiving elements 51, 52 and 57, 58 coincides with a center line of the optical receiving element 53. Thus, the optical receiving element 53 is in the center of the track image when the common bisected line of the bisected optical receiving elements 51, 52 and 57, 58 is on the track image. The outputs of the bisected optical receiving elements 51, 52, 57 and 58 are compared to each other. A difference between the outputs of the bisected optical receiving elements 51, 52 equals to a difference between the outputs of the bisected optical receiving element 57, 58 under the condition that the optical receiving element 53 is on the center of the track image, even when there are the eccentricity of the optical disk and/or the shift of the incident angle of the light beam caused by the position of the pickup apparatus. It is provided that the signal band required by a servo signal is considered and the brightness and darkness of pits is not influenced by the servo band.

Figure 17:
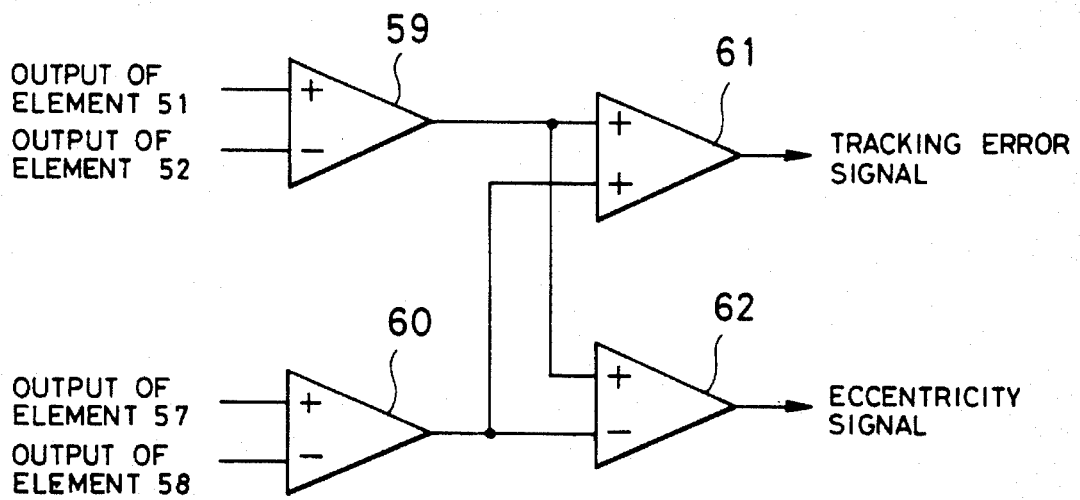
FIG. 17 is a schematic circuit diagram of a circuit for generating a tracking error signal and an eccentric signal used in another optical pickup apparatus according to the present invention of FIG. 15.

When the track image 55 shifts towards the optical receiving element 53, the light quantity received by each of the bisected optical receiving elements 51, 57 becomes small. When the track image 56 shifts towards the optical receiving element 53, the light quantity received by each of the bisected optical receiving elements 52, 58 becomes small. Thus, the tracking error signal and an eccentricity signal representing an eccentricity of the optical disk are produced by four differential amplifiers 59–62 as shown in FIG. 17 included in the tracking servo circuit 114 of FIG. 10. In other words, the differential amplifier 59 generates a difference between outputs of the bisected optical receiving elements 51, 52 and supplies it to the differential amplifiers 61, 62. The differential amplifier 60 generates a difference between outputs of the bisected optical receiving elements 57, 58 and also supplies it to the differential amplifiers 61, 62. The differential amplifier 61 adds the supplied difference signals from the differential amplifiers 59, 60 to each other to produces a sum signal as a tracking error signal. The objective lens 33 is driven by the tracking control driving mechanism 38 in the radial direction of the optical disk in response to the tracking error signal so that the optical receiving element 53 receives the track image at the center thereof, even when there are the eccentricity of the optical disk and/or the shift of the incident angle of the light beam caused by the position of the pickup apparatus. Thus, the pickup apparatus surely reads the recorded signal from the optical disk. Furthermore, the differential amplifier 62 subtracts the difference signal output of the differential amplifier 60 from the difference signal output of the differential amplifier 59 to produces a difference signal as an eccentricity signal. When the change of this eccentricity signal per one rotation of the optical disk is detected, an eccentricity of the optical disk is defined. In this way, the shift concerning the angle of the photodetector is detected on the basis of the constant component in the eccentricity signal. The resultant eccentricity signal enables to facilitate the searching operation of the pickup apparatus. For example, the tracking servo circuit 114 of FIG. 10 may include a circuit for computing previously the number of track to be crossed by the spot light irradiated by the pickup apparatus in accordance whit the resultant eccentricity signal so as to shorten the access time of searching of a recorded signal on a specific track.

In the foregoing embodiments, the pickup apparatus for reproducing the recorded signal from the pit trains on the optical disk is described. Off cause, the present invention is applicable for reproducing a recorded signal from an optical disk on which a pre-groove for guiding the light spot is spirally or concentrically formed on the optical disk. Although the recording medium in the embodiments is a disk shape, it is not limitative. The invention is applicable to an optical recording medium such as an optical card or tape.

Figure 18:
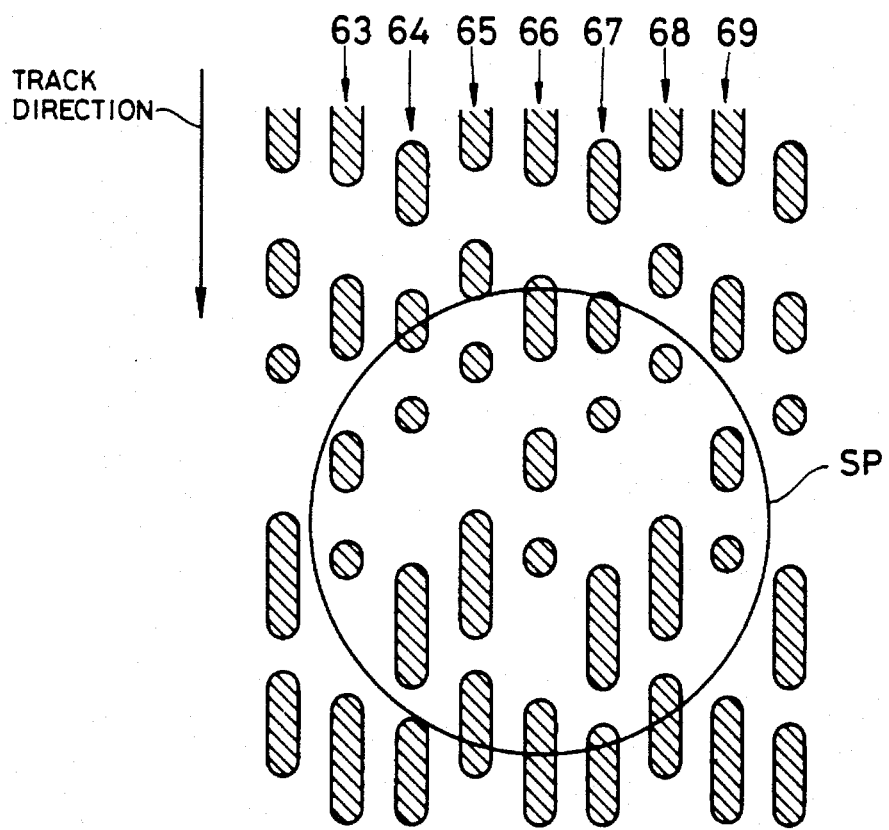
FIG. 18 is a partially enlarged plan view of an optical disk showing irradiated light spots formed thereon by another optical pickup apparatus according to the present invention.
Figure 19:
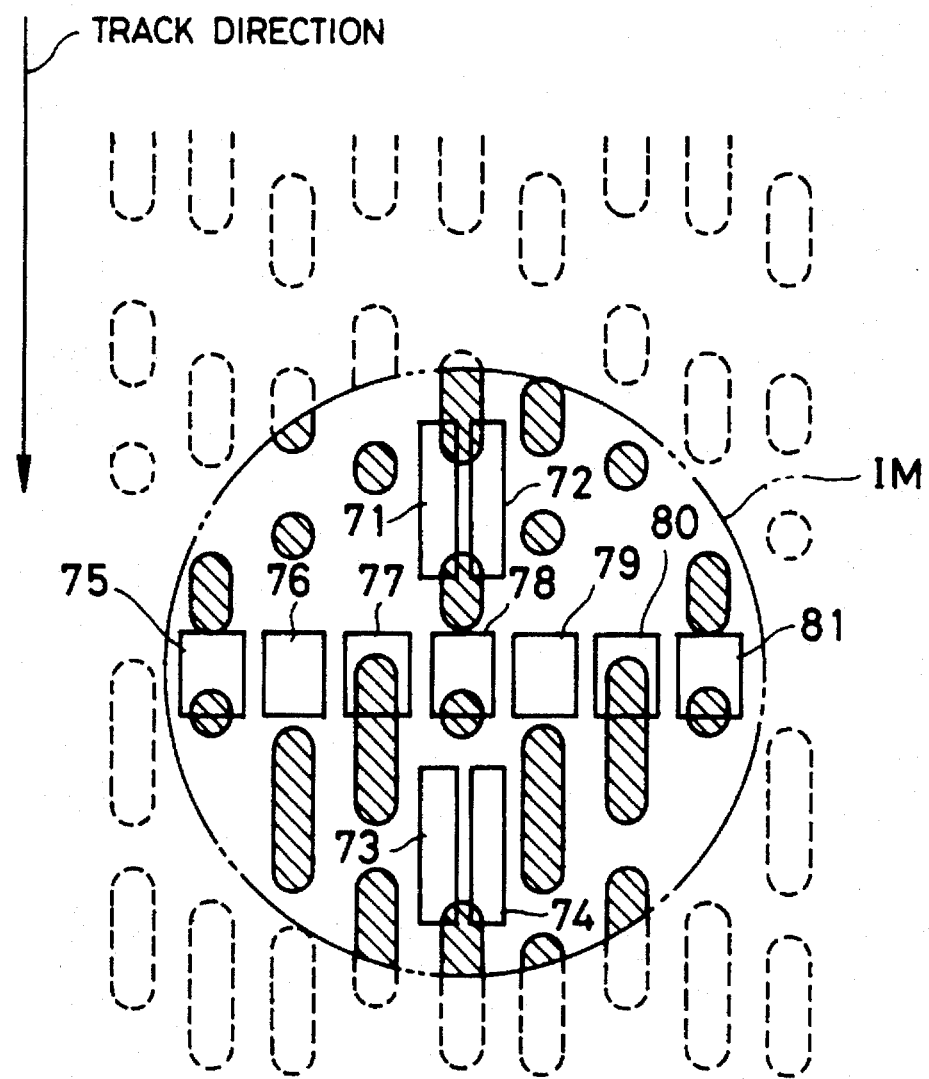
FIG. 19 is a partially enlarged plan view of a photodetector showing a real image of tracks and pits formed thereon and its optical receiving elements for detecting the images used in the optical pickup apparatus according to the present invention of FIG. 18.

FIG. 18 shows a third embodiment according to the present invention to improve the transfer rate in which a light spot SP of a light beam is irradiated over seven tracks 63–69 on the optical disk 34. FIG. 19 shows optical receiving elements 71–81 on the photodetector 35 in the pickup apparatus and images of tracks 63–69 and pits PT formed thereon by the reflected light from the light spot SP. The optical receiving element 71–81 included in the photodetector 35 collectively read the recorded signals from a plurality of tracks at the same time. A pair of the bisected optical receiving elements 71, 72 and 73, 74 are used for the tracking servo control in a similar manner shown in the foregoing second embodiment. The optical receiving elements 75–81 arranged in a direction perpendicular to the track image direction are used for collectively reading the recorded signals from the seven tracks 63–69. By using this construction, the pickup apparatus of FIG. 10 may be provided with a mechanism for track-jumping repeatedly over a spiralling track of the optical disk so as to avoid the overlapping of the reading operations to the same track.

Figure 20:
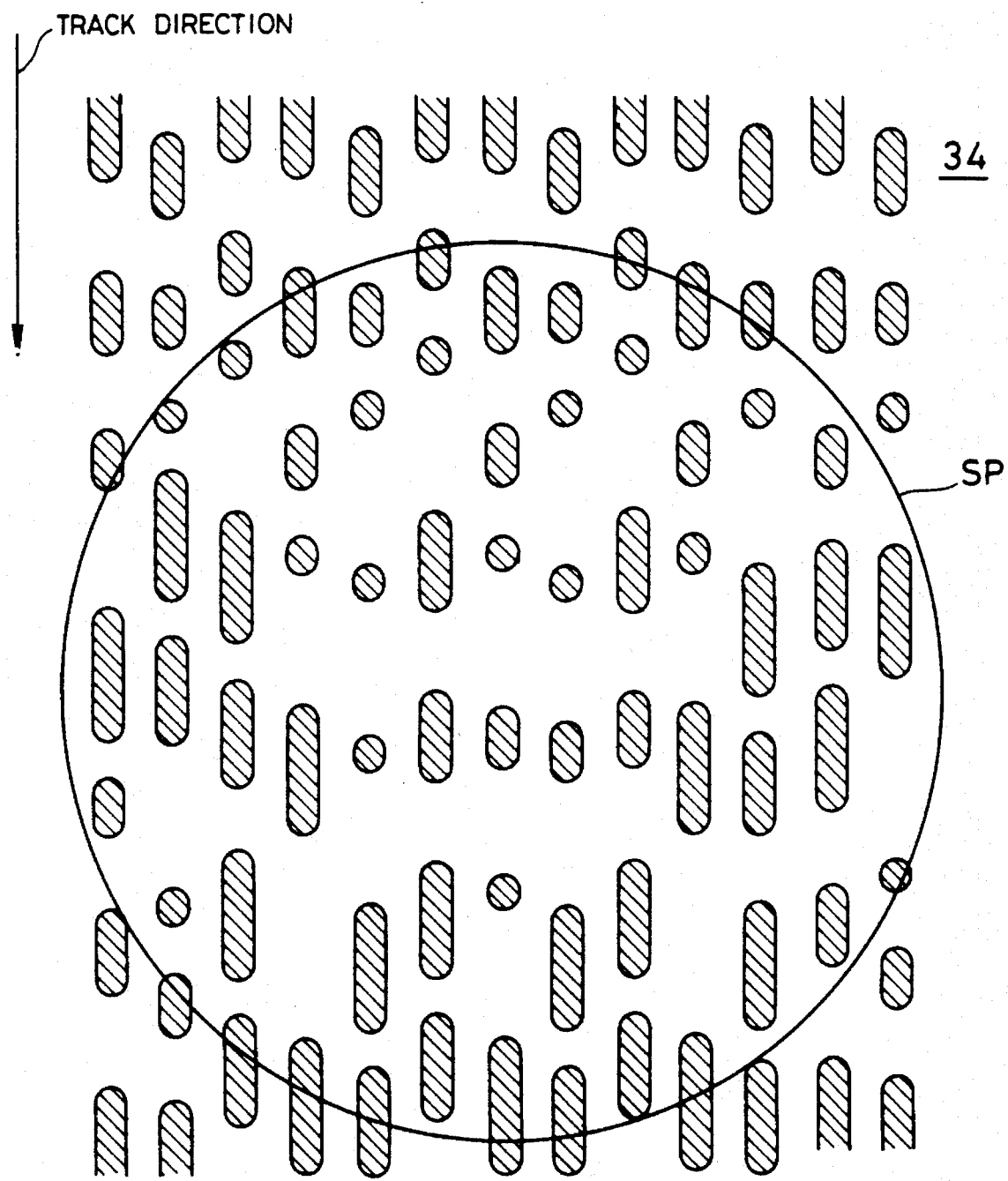
FIG. 20 is a partially enlarged plan view of an optical disk showing irradiated light spots formed thereon by another optical pickup apparatus according to the present invention.
Figure 21:
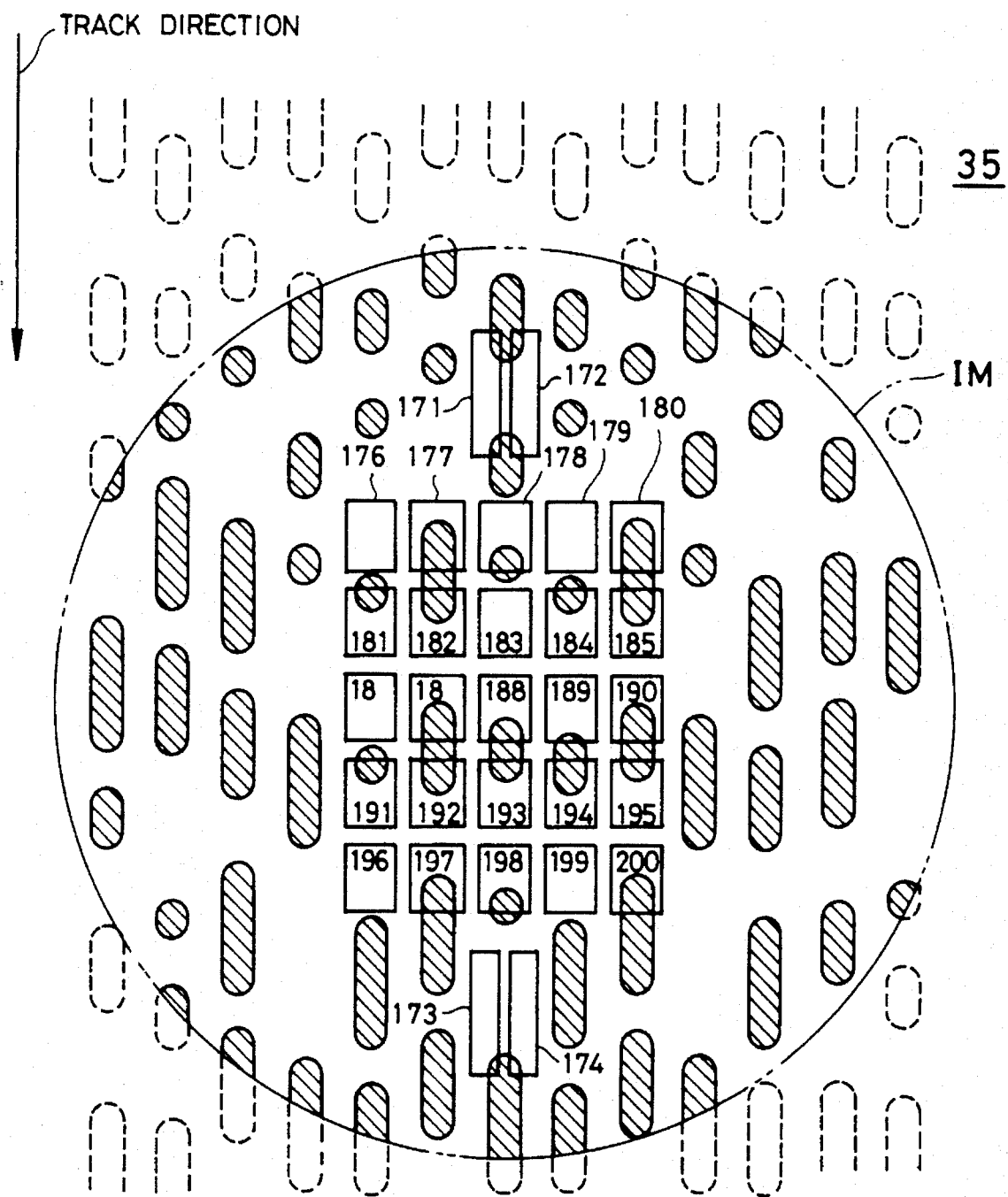
FIG. 21 is a partially enlarged plan view of a photodetector showing a real image of tracks and pits formed thereon and its optical receiving elements for detecting the images used in the optical pickup apparatus according to the present invention of FIG. 20.

Although a signal-reading photodetector for read one pit train from one track in the foregoing first and second embodiments is described, it is not limitative. The signal-reading photodetector is divided into a plurality of a photodetector elements. For example, the invention is applicable to the one dimensional array shown in the third embodiment in which the elements arranged in a direction perpendicular to the track image direction. Alternatively, the invention is applicable to a pickup apparatus having a two dimensional array shown in FIGS. 20 and 21. In this case, FIG. 20 shows a light spot SP of a light beam is irradiated over thirteen tracks on the optical disk 34. FIG. 21 shows optical receiving elements 171, 172 and 173, 174 and 176–200 on the photodetector 35 in the pickup apparatus and images of tracks and pits formed thereon by the reflected light from the light spot SP in which the matrix optical receiving elements 171–200 are arranged in both a track image direction and a direction perpendicular to the track image direction as a two dimensional array which is sandwiched between a pair of the bisected optical receiving elements 171, 172 and 173,174. In this way, there are various arrangements of elements for reading the recorded signal in the invention. In addition, the shape of the optical receiving element may be any form such as a triangle, ellipse, oblong or trapezoid other than the rectangle shape element in the foregoing embodiments. Further, the shape of the bisecting line in the optical receiving element is not limited. For example, the gap distance between the bisected elements may be partially changed, and alternatively the bisecting line may be curved in response to the aberration of the optic system.

Furthermore, the arrangement of the pair of the bisected optical receiving elements used for the tracking control is not limitative, although the pair of the bisected optical receiving elements 51, 52 and 57, 58 are symmetrically arranged to each other with respect to the signal-reading optical receiving element 53 in the embodiment shown in FIG. 16. In addition to the symmetrical arrangement of the pair elements, the pair of the bisected optical receiving elements may be disposed so as to be shifted with respect to track image direction, so that the apparatus amends an error signal caused by the sifted pits appearing in the optical disk e.g., the sifted pits are so-called prowling in which the pits are non-symmetrically formed on the disk in the manufacturing process.

According to the present invention of the pickup apparatus as described above, the optical receiving elements of the photodetector used for both the tracking control and the signal-reading operations are individually arranged in adjacent to each other on the image surface corresponding to the surface of the recording medium, wherein the tracking-control element has a width in a perpendicular direction to the track direction smaller than a distance resulted from that twice of a track pitch in a track image formed on the tracking-control optical receiving element is subtracted by a width of the track image. Therefore, this optical pickup apparatus is capable of stably reading a recorded signal from an optical disk and of stably performing a tracking operation by a simple construction thereof.

What is claimed is:

1. An optical pickup apparatus for reading a recorded signal from a track of a recording medium comprising:

an irradiation optical system for irradiating a light beam to at least one track of a recording medium carrying a recorded signal to be read, each of said at least one track being constituted by a single sequence of pits extending in a track direction of said recording medium;

an image formation means for performing an image formation of a real image for said recorded signal or said track of said recording medium to make an image surface by using a reflected light from an irradiated portion of said light beam;

a photodetection means for detecting the reflected light and having an optical receiving element disposed on said image surface; and said optical receiving element having:

at least one first optical receiving element of tracking control bisected in said track direction of a track image formed on said image surface, wherein said first optical receiving element has a width in a perpendicular direction to the track direction which is smaller than a distance represented by twice a track pitch of a track image formed on said first optical receiving element less a width of said track image, and at least one second optical receiving element of signal-reading disposed adjacent to said first optical receiving element in the track direction of the track image.

2. An optical pickup apparatus according to claim 1, wherein the bisected two portions of said first optical receiving element are symmetrically disposed with respect to the track direction passing the center of said second optical receiving element.

3. An optical pickup apparatus according to claim 2, further comprising means for subtracting one from the other of two out puts of the bisected two portions of said first optical receiving element to generate a tracking error signal.

4. An optical pickup apparatus according to claim 3, wherein two of said first optical receiving elements are symmetrically disposed with respect to said second optical receiving element in the track direction of the track image.

5. An optical pickup apparatus according to claim 4, further comprising means for adding two difference signals each supplied from means for subtracting one from the other of two out puts of the bisected two portions of said first optical receiving element to generate a resultant sum signal as a tracking error signal.

6. An optical pickup apparatus according to claim 3, wherein two or more of said second optical receiving elements are symmetrically disposed with respect to a center of the group of said second optical receiving elements.

7. An optical pickup apparatus according to claim 6, wherein two of said first optical receiving elements are symmetrically disposed with respect to said second optical receiving element in the track direction of the track image.

8. An optical pickup apparatus according to claim 7, further comprising means for adding two difference signals each supplied from means for subtracting one from the other of two out puts of the bisected two portions of said first optical receiving element to generate a resultant sum signal as a tracking error signal.

9. An optical pickup apparatus according to claim 1, wherein said at least one second optical receiving element reads from said track data other than clock data.

10. An optical pickup apparatus according to claim 1, wherein said at least one second optical receiving element reads the same said track that said at least one first optical receiving element reads.

11. An optical pickup apparatus for reading a recorded signal from a track of an optical disk, comprising:

an irradiation optical system for irradiating a light beam to at least one track of the optical disk carrying a recorded signal to be read;

an image formation means for performing an image formation of a real image for said recorded signal or track of said optical disk to make an image surface by using a reflected light from an irradiated portion of said light beam;

a photodetection means for detecting the reflected light and having an optical receiving element disposed on said image surface;

said optical receiving element having:

at least one first optical receiving element of tracking control bisected in a track direction of a track image formed on said image surface, wherein said first optical receiving element has a width in a perpendicular direction to the track direction which is smaller than a distance represented by twice a track pitch of a track image formed on said first optical receiving element less a width of said track image, and at least one second optical receiving element of signal-reading disposed adjacent to said first optical receiving element in the track direction of the track image, wherein two of said first optical receiving elements are symmetrically disposed with respect to said second optical receiving element in the track direction of the track image, and the bisected two portions of said two of said first optical receiving elements are symmetrically disposed with respect to the track direction passing the center of said second optical receiving element;

means for subtracting one from the other of two outputs of the bisected two portions of each of said two of said first optical receiving element to generate two difference signals;

means for adding said two difference signals, each being supplied from said means for subtracting, to generate a resultant sum signal as a tracking error signal; and means for subtracting one from the other of said two difference signals, each supplied from said means for subtracting, to generate a resultant difference signal as an eccentric signal representing an eccentricity of said optical disk.

12. An optical pickup apparatus for reading a recorded signal from a track of an optical disk, comprising:

an irradiation optical system for irradiating a light beam to at least one track of the optical disk carrying a recorded signal to be read;

an image formation means for performing an image formation of a real image for said recorded signal or track of said optical disk to make an image surface by using a reflected light from an irradiated portion of said light beam;

a photodetection means for detecting the reflected light and having an optical receiving element disposed on said image surface;

said optical receiving element having:

at least one first optical receiving element of tracking control bisected in a track direction of a track image formed on said image surface, wherein said first optical receiving element has a width in a perpendicular direction to the track direction which is smaller than a distance represented by twice a track pitch of a track image formed on said first optical receiving element less a width of said track image, and at least one second optical receiving element of signal-reading disposed adjacent to said first optical receiving element in the track direction of the track image, wherein two of said first optical receiving elements are symmetrically disposed with respect to said second optical receiving element in the track direction of the track image, the bisected two portions of said two of said first optical receiving elements are symmetrically disposed with respect to the track direction passing the center of said second optical receiving element, and two or more of said second optical receiving elements are symmetrically disposed with respect to a center of the group of said second optical receiving elements;

means for subtracting one from the other of two outputs of the bisected two portions of each of said two of said first optical receiving element to generate two difference signals;

means for adding said two difference signals, each being supplied from said means for subtracting, to generate a resultant sum signal as a tracking error signal; and means for subtracting one from the other of said two difference signals, each supplied from said means for subtracting, to generate a resultant difference signal as an eccentric signal representing an eccentricity of said optical disk.

* * * * *